(12) United States Patent
Remillard et al.

(10) Patent No.: US 7,121,685 B2
(45) Date of Patent: *Oct. 17, 2006

(54) COLOR-CORRECTED LASER ILLUMINATION SYSTEM FOR NIGHT VISION APPLICATIONS

(75) Inventors: Jeffrey T. Remillard, Ypsilanti, MI (US); Willes H. Weber, Ann Arbor, MI (US); Kenneth E. Nietering, Dearborn, MI (US); Michael A. Marinelli, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 227 days.

This patent is subject to a terminal disclaimer.

(21) Appl. No.: 10/707,425

(22) Filed: Dec. 12, 2003

(65) Prior Publication Data

US 2005/0128727 A1  Jun. 16, 2005

Related U.S. Application Data

(63) Continuation-in-part of application No. 10/064,116, filed on Jun. 12, 2002, now Pat. No. 6,900,437.

(51) Int. Cl.
*G01J 5/00* (2006.01)

(52) U.S. Cl. .................. 362/231; 362/259; 362/612; 362/613; 250/330; 250/338.1

(58) Field of Classification Search ............... 362/231, 362/228, 800, 612, 613, 626, 259; 250/330, 250/331.1, 339.06, 504 R, 495.1, 340
See application file for complete search history.

(56) References Cited

U.S. PATENT DOCUMENTS

| | | | | |
|---|---|---|---|---|
| 4,963,798 | A | * | 10/1990 | McDermott ............... 315/312 |
| 5,685,637 | A | * | 11/1997 | Chapman et al. .......... 362/263 |
| 6,900,437 | B1 | * | 5/2005 | Remillard et al. ......... 250/330 |

\* cited by examiner

*Primary Examiner*—Thomas M. Sember
(74) *Attorney, Agent, or Firm*—Frank A. MacKenzie

(57) ABSTRACT

A color-corrected lighting system for night vision applications includes a near infrared light source and a thin-sheet optical element disposed a distance from the near infrared source. The optical element includes an input surface for receiving light from the near infrared source and an output surface for emitting the received light in a desired emission pattern. The system also includes a visible, non-red light source in the form of a plate having a plurality of non-red LEDs arranged thereon. The plate is proximate a surface of the optical element such that the output surface of the optical element emits the visible light to mask the emitted near infrared light. A camera is adapted to receive the near infrared light from the near infrared light source reflected off an object within a camera field of view, and a display images objects detected within the camera field of view.

20 Claims, 5 Drawing Sheets

COLOR-CORRECTED LASER
ILLUMINATION SYSTEM FOR NIGHT
VISION APPLICATIONS

RELATED APPLICATION

The present application is a continuation-in-part of application Ser. No. 10/064,116, now U.S. Pat. No. 6,900,437 B2, filed on Jun. 12, 2002, entitled "COLOR CORRECTED LASER ILLUMINATION SYSTEM FOR NIGHT VISION APPLICATIONS", which is incorporated by reference herein.

BACKGROUND OF INVENTION

The present invention relates to night vision systems, and particularly concerns a color-corrected laser illumination system for night vision applications.

Conventional lighting systems used in automotive vehicle applications such as headlights and taillights utilize an incandescent bulb with a reflector. The light emitted by the incandescent bulb is generally collimated by the reflector. The incandescent bulb is used to generate light in the visible spectrum for headlight and taillight applications. Active night vision systems typically require near-infrared emission that is compatible with solid-state CCD or CMOS cameras to illuminate the region forward of the vehicle.

Advances in solid-state lasers have given rise to thin-sheet lighting systems for use in taillight and active night vision systems. The thin sheet systems require less space than bulb and reflector systems. Furthermore, laser diodes are more energy efficient and reliable than incandescent bulbs. A challenge in thin-sheet lighting systems is to rapidly spread the laser light over a sufficiently wide area to meet spatial illumination requirements for good visibility and, at the same time, eye safety requirements as mandated under laws governing such applications.

U.S. Pat. No. 6,422,713 issued Jul. 23, 2002 and entitled "Thin-Sheet Collimation Optics For Diode Laser illumination Systems For Use In Night Vision And Exterior Lighting Applications" describes thin-sheet collimation optics which can be used to produce eye-safe, diode laser-based headlamps for night vision applications. The emission patterns of optics such as disclosed in the referenced application are similar to those of "high-beam" headlamps in that they project far forward to illuminate objects at long range and also provide spread-light for illuminating objects at close range on either side of the vehicle.

For most night vision applications, the laser emission wavelength is typically in the near infrared range (800–900 nm), for example, 810 nm which is outside the spectrum of light normally considered to be visible to the human eye (400–750 nm). Moreover, although the human eye is extremely insensitive to near infrared light, it may be possible under certain conditions for a driver to perceive a near infrared night vision laser headlamp of an approaching vehicle as a dim red light. Current government guidelines prohibit the use by a non-law-enforcement or non-emergency vehicle of any forward lighting device that could be perceived as "red" by other vehicle operators. Thus, there exists a need for "color-corrected" laser headlamps for night vision applications that could not be perceived as red light by other vehicle operators.

SUMMARY OF INVENTION

The present invention provides a color-corrected laser illumination system for night vision applications. A color-corrected laser illumination system in accordance with one embodiment of the invention includes a near infrared light source and a thin-sheet optical element disposed a distance from the near infrared source. The optical element includes an input surface for receiving light from the near infrared source and an output surface for emitting the received light in a desired emission pattern. The system also includes a visible, non-red light source in the form of a plate having a plurality of non-red LEDs arranged thereon. The plate is proximate a surface of the optical element such that the output surface of the optical element emits the visible light to mask the emitted near infrared light. A camera is adapted to receive the near infrared light from the near infrared light source reflected off an object within a camera field of view, and a display is used to show images of objects detected within the camera field of view.

In one embodiment, the color-corrected laser illumination system includes a thin-sheet optical element to provide an illumination pattern similar for use in a night vision system. With regard to the optical element, light enters the optical element through an input surface and exits the optical element through an output surface that is substantially perpendicular to the input surface. A stepped surface of the optical element is angled between the input surface and the output surface to intersect the light. Multiple facets are formed in the stepped surface to reflect the light toward the output surface. The facets, input surface and output surface are arranged such that light reflects from only the facets in passing from the input surface to the output surface. The result is that the divergent emission pattern of the light emitted from the source is manipulated into a broader illumination pattern emitted from the output surface. In one embodiment, the facets are arranged in a striped pattern paralleling a narrow dimension of a rectangular shape. In such a case, the input surface has a curvilinear shape to collimate the light in a first plane parallel to the output surface. In another embodiment, the facets are arranged along arcs about an axis normal to the output surface.

The present invention is advantageous in that it provides a mechanism for masking the near infrared light emitted by the night vision system such that the light cannot be perceived as red light by other vehicle operators. Another advantage of the present invention is that it provides an optically efficient optical element capable of producing a desirable, broad illumination pattern.

Other advantages and features of the invention will become apparent to one of skill in the art upon reading the following detailed description with reference to the drawings illustrating features of the invention by way of example.

BRIEF DESCRIPTION OF DRAWINGS

For a more complete understanding of this invention, reference should now be made to the embodiments illustrated in greater detail in the accompanying drawings and described below by way of examples of the invention.

In the drawings.

DETAILED DESCRIPTION

While the present invention is described with respect to an active night vision system for a vehicle, the present invention may be adapted and utilized for other applications where a near infrared light source is utilized.

In the following description, various operating parameters and components are described for two constructed embodiments. These specific parameters and components are included as examples and are not meant to be limiting.

Figure 1:
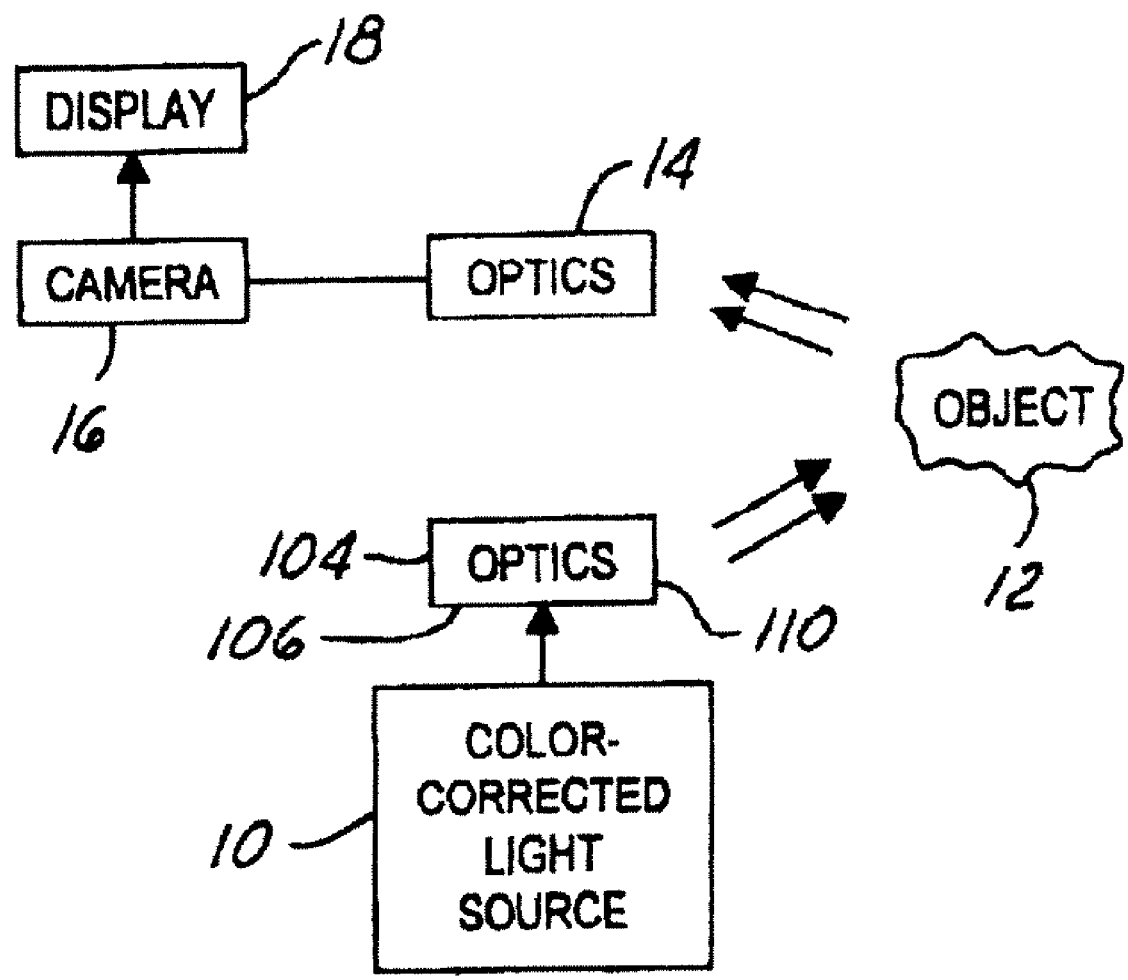
FIG. 1 is a schematic block diagram of one embodiment of the present invention utilized in an active night vision system.

Referring now to the drawings wherein like reference numerals are used to identify identical components in the various views, FIG. 1 illustrates a schematic block diagram of the present invention utilized in an active night vision system. In this example, the color-corrected light source 10 is used to generate a near infrared light. An optical element 104, such as a thin-sheet optical element, receives the light through an input surface 106. The light is reflected inside the optical element 104 and transmitted through an output surface 110. A lens, diffuser, holographic plate, pillow optics, diffractive optics, or any other optical device may be positioned adjacent or adjoining the output surface 110 to manipulate the laser light to create a desired illumination pattern ahead of the night vision system. Alternatively, the optical element 104 can be designed to emit the desired illumination pattern by itself.

Light emitted from the output surface 110 of the optics 104 illuminates objects such as object 12 within the field of view of the night vision system. Object 12 reflects the laser light back towards the night vision system. Optical elements 14 process the light reflected from object 12 and communicate the desired light data to a camera 16.

The camera 16 processes the light data and presents it to a display 18 such that the object information can be made known to the system user. The camera 16 can be a silicon-based CCD or CMOS camera filtered to see light at the same wavelength as the NIR source such as at 810 nm. Optics 14 typically include a narrow band filter to shield the camera 16 from light outside the range of interest, i.e., the near infrared range.

Figure 2:
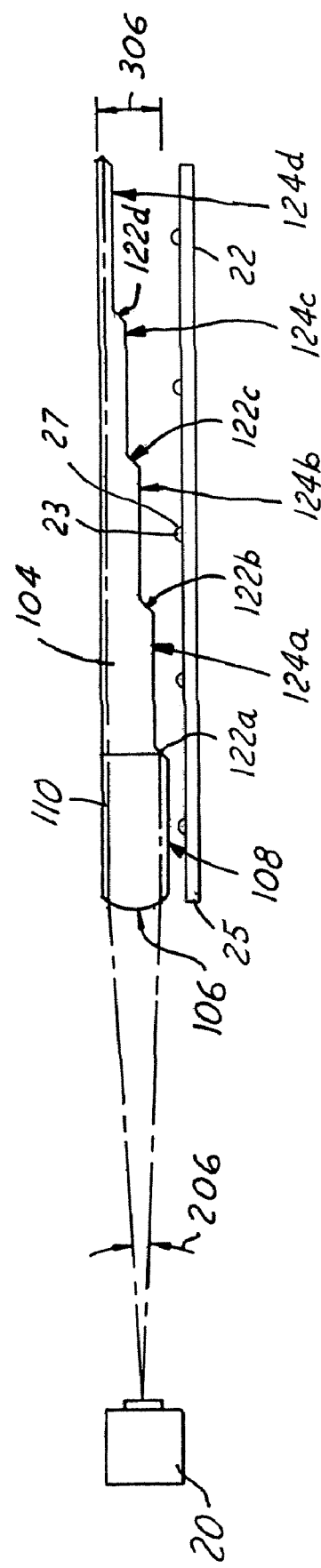
FIG. 2 is a side view of a first embodiment of an optical element for use with the color-corrected lighting system.

Referring now to FIG. 2 there is shown a schematic diagram of the color-corrected light source 10 and the optical element 104 of FIG. 1. The color-corrected light source includes a near infrared light source 20 and a color-correcting light source 22. The near infrared source 20 can comprise an LED or diode laser which emits light in the near infrared range of approximately 800 to 900 nm, such as 810 nm. The NIR source 20 is the primary light source used in the night vision system for illuminating objects in the night vision system field of view.

The color-correcting visible light source 22 can include an incandescent filament, a halogen bulb, a LED or any other similar light source that provides light across at least a portion of the visible spectrum of light. Preferably, the light source 22 emits light in a region of the visible spectrum other than red light although the red wavelengths can be included in the light spectrum emitted by light source 22. In one embodiment, the light source 22 includes a plurality of green, white, or amber LEDs 23 with the emission intensity selected such that, when combined with the NIR source 20, a white or other non-red image is perceived by the human visual system.

The color-correcting LEDs 23 are arranged on a plate 25 in a pattern that substantially covers the emitting area of the thin-sheet optic 104. The plate 25 is positioned adjacent the emitting surface of the optic 104 such that it fills the emitting aperture with non-NIR light. The plate 25 can be, for example, metallic or plastic. Thus, optical element 104 receives the combined light provided by NIR source 20 and color-corrected LEDs 23 and emits both in the same beam pattern. Each LED 23 can include its own collimating lens 27 and each can be arranged in a direction such that upon passing through the optic 104, the color-corrected light is collimated approximately parallel to the NIR light. Suitable color-corrected LEDs 23 are Luxeon sources from LumiLeds Corporation, part number LXHL-MW1D (white) and LXHL-ML1D (amber). Similar LEDs are also available from Osram Corporation.

Depending upon the particular faceting of the optical element 104 and location of the NIR source 20, the relative position of the color-correcting source 22 with respect to the optical element 104 can vary. Thus, although proximate and adjacent the optical element 104, it is to be understood that the color-correcting source 22 need not be in the position shown in the examples of FIGS. 3–5.

In operation, because the color-correcting light source 22 is being emitted in the same beam pattern as the NIR source 20, the resulting illumination output will be perceived as white-light, or at least non-red light, by operators of vehicles approaching in the opposite direction or vehicle operators in front of the vehicle equipped with such a night vision system.

Figure 3:
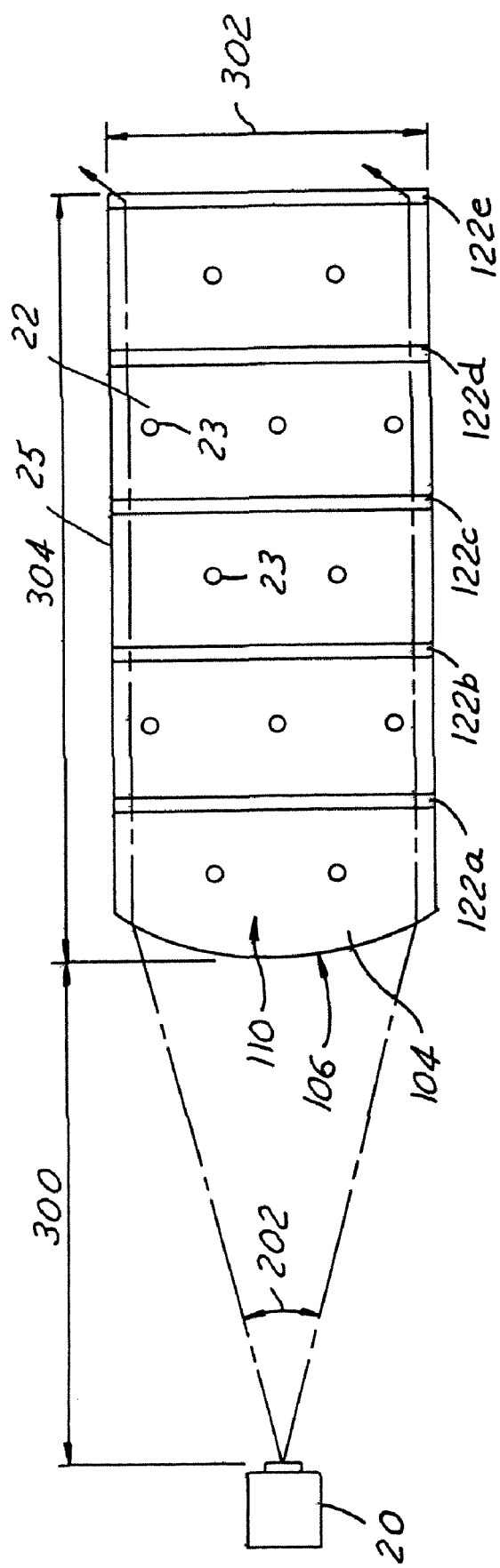
FIG. 3 is a front view of the optical element of FIG. 2.

Details of the optical element 104 will now be described with reference to FIGS. 2 and 3. FIG. 2 shows a side view of a first embodiment of the optical element for the color-corrected lighting system. FIG. 3 is a front view of the optical elements of FIG. 2. The optical element 104 is used to transmit the light from the near infrared light source 20 and the light from the light source 22 in substantially the same pattern.

Light emitted from the NIR source 20 has an associated first and second divergent emission angle 202, 206. The first divergent emission angle is typically on the order of 35°, while the second divergent emission angle 206 is typically on the order of 10°. However, the first and second divergent emission angles 202, 206 may be larger or smaller depending upon the type and design of the respective light sources 20. The optical element 104 takes advantage of these divergent angles 202, 206 to spatially expand the light sources emission patterns without requiring additional optics commonly found in other designs. Of course, other types of light sources 20 which emit divergent light at other wavelengths may be used within the scope of the present invention.

The NIR source 20 is positioned away from the optical element 104, by a predetermined distance as indicated by distance 300. Predetermined distance 300 is chosen so that the light spatially expands a desired amount along a direction parallel to a width of the optical element 104.

The width of the optical element is indicated by dimension 302.

In the example shown, the light fills the input surface 106 in the width 302 direction. When used in a night vision system, a preferred width 302 of the optical element 104 is approximately 50 mm. Larger and smaller widths 302 may be used within the scope of the present invention as required by the particular application.

Input surface 106 of optical element 104 has an aspherical curve to collimate the light as it enters the optical element 104. Collimation is accomplished in a plane parallel to the output surface 110 and along a direction parallel to a length of the optical element 104. The length is indicated by dimension 304.

FIG. 3 is a front view of the NIR light source 20 and white light source 22 and optical element 104 shown in FIG. 2.

The light emitted from the light source 20 spatially expands over predetermined distance 300 along a direction parallel to a depth of the optical element 104. The depth of optical element 104 is indicated by dimension 306 shown in FIG. 2.

In the preferred embodiment, the light fills the input surface 106 in the depth 306 direction. Depth 306 of the optical element 104 generally ranges from around 5 mm to around 10 mm. Thicker and thinner depths 306 may be used within the scope of the present invention. For example, depth 306 could be made as thin as one millimeter.

Input surface 106 of optical element 104 may have curvature along the depth 306 direction to collimate the light in a plane perpendicular to the output surface. Collimation is accomplished along a direction parallel to the length 304 of the optical element 104 in a plane perpendicular to the output surface 110.

Stepped surface 108 is formed in the optical element 104 generally angled between input surface 106 and output surface 110. As viewed in FIG. 2, stepped surface 108 spans between the bottom of input surface 106 to the far side of output surface 110.

Stepped surface 108 is formed with multiple facets 122a–e arranged in a stair-like configuration. Facet 122a is the lowest facet 122 of the stair and the closest facet 122 to input surface 106. Facet 122e is the highest facet 122 of the stair and the furthest facet 122 from input surface 106. Facets 122 are separated from each other by flat regions 124. Flat regions 124 are arranged to be parallel to the output surface 110.

Each facet 122 is formed at an angle with respect to the output surface 110. In one embodiment, all of the facets 122 are set at a 45° angle to reflect the light towards output surface 110 along a direction normal to the output surface 110. Other angles may be used, including different angles for different faces 122 to produce variations in the illumination pattern.

All of the facets 122 are designed to reflect the collimated light using total internal reflection. Total internal reflection of light occurs in an optical medium where an incident angle θ of light upon a surface exceeds a critical angle $\theta_C$ given by equation 1:

$$\theta_C = \sin^{-1}(n_1/n_2)$$

wherein $n_1$ is the index of refraction of a surrounding medium and $n_2$ is the index of refraction of the optical medium.

In one embodiment, the optical element 104 is fabricated from a polycarbonate having an index of refraction of approximately $n_2 = 1.489$. Furthermore, the surrounding medium is air with an index of refraction of unity ($n_1 = 1$). This produces a critical angle of approximately $\theta_C = 42°$. With the facets 122 angled at 45° with respect to the incident light, then the light will reflect from the facets by the process of total internal reflection.

Some applications within the scope of the present invention may require the facets 122 to be angled less than the critical angle. In these cases, a layer of reflective material, such as metal, may be deposed on the outside of the stepped surface 108. Alternatively, other transparent optical materials having other indices of refraction may be used including, but not limited to acrylic, plastic and glass.

The number of facets 122 and the size of each facet 122 is application specific. In general, there should be at least three or more facets 122. Increasing the number of facets 122 increases the uniformity of the illumination pattern emitted through the output surface 110 at the cost of a thicker optical element 104. Uniformity of the illumination pattern can be improved by slightly curving the facets 122 in one or more directions so that they cause a slight dispersion of the light as they reflect the light.

The effect of the optical element 104 is to disperse the optical energy emitted from the light sources 20, 22 over a large area. Using the preferred dimensions of 50 mm for width 302, 125 mm for length 304 and 5 mm for depth 306, the optical element 104 has an input surface area to output surface area ratio of 4%. Ignoring optical losses, this translates into the optical irradiance exiting the output surface 110 that is on average twenty-five times smaller than what is entering the input surface 106. This ratio can be changed by changing the optical element's dimensions 302, 304 and 306. For example, increasing the depth to 12.5 mm changes the ratio to 10%. Decreasing the depth to 1.25 mm decreases the ratio to 1%. This ratio can be adjusted to provide a desired optical irradiance at the output surface 110.

Figure 4:
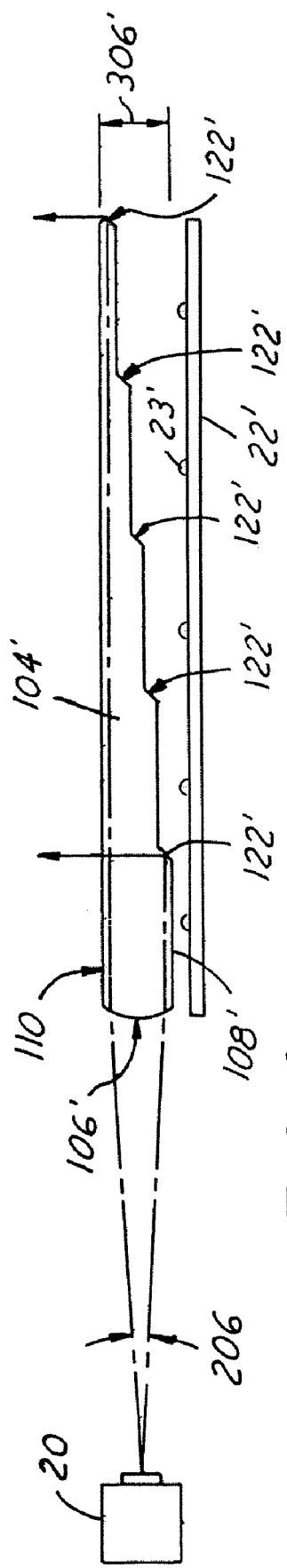
FIG. 4 is a side view of a second embodiment of an optical element for use with the color-corrected lighting system.
Figure 5:
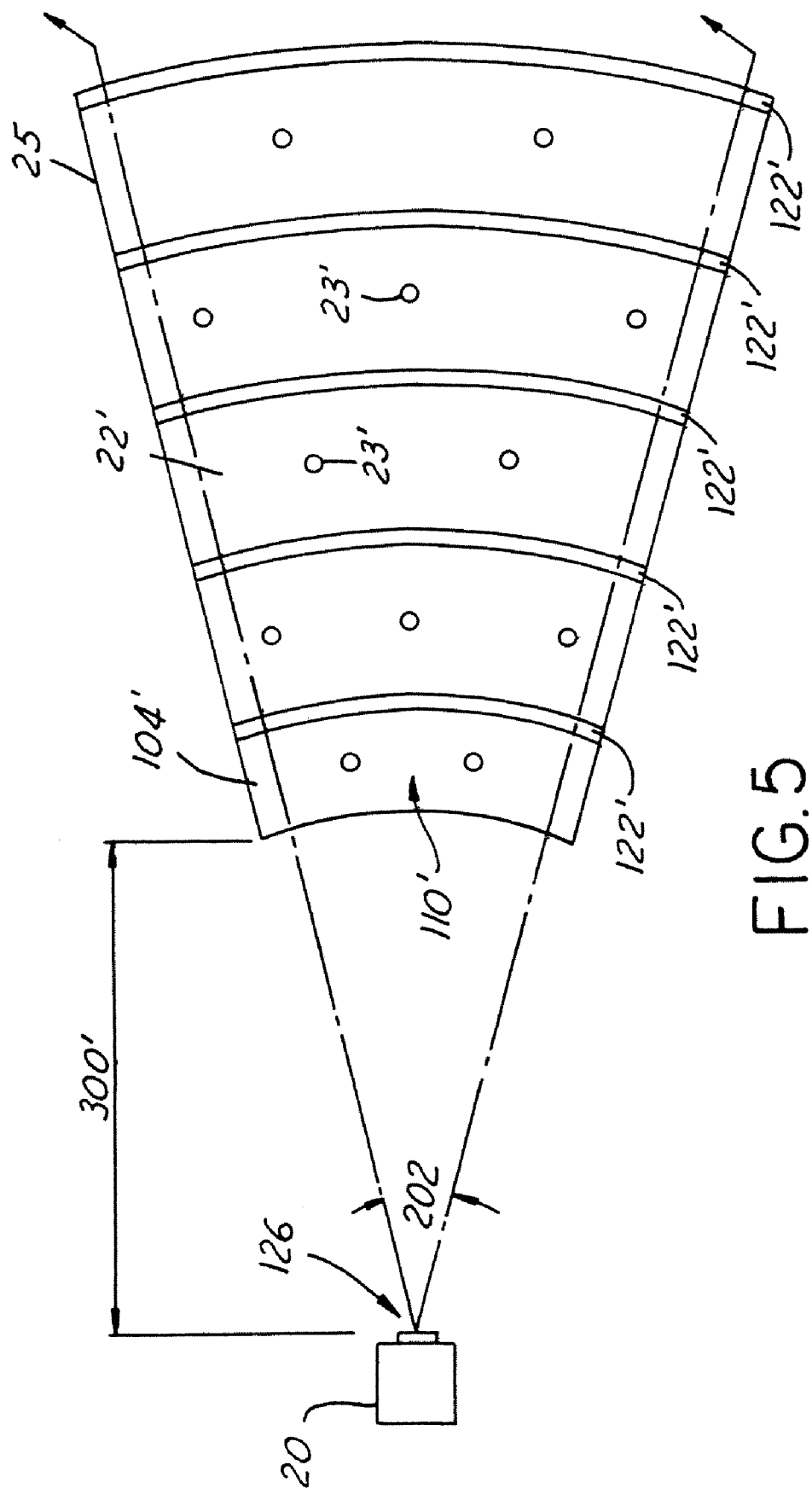
FIG. 5 is a front view of the optical element of FIG. 4.

Referring now to FIGS. 4 and 5, there is shown an alternate embodiment for the optical element 104. In the examples of FIGS. 4 and 5, a single optical element is again shown to transmit the light from the NIR source 20 and white-light source 22. Depending upon the divergent angles of the emitted light from the NIR light source 20, a diffuser may also be required to fill the input surface 106 with light from the light source 20.

The optical element 104' has a generally wedge-shaped output surface 110'. Facets 122' follow along arcs at various radii about a central axis 126 normal to the output surface 110'. Likewise, input surface 106' follows an arc about the central axis 126.

In this embodiment, the NIR source 20 is positioned with its output at the central axis 126. As light spreads out from the light source 20 in the first divergent angle 202, it enters the optical element 104' perpendicular to the input surface 106' as measured in the plane parallel to the output surface 110'. Input surface 106' allows the light to continue to diverge at the first divergent emission angle 202 inside the optical element 104'. There is no need to collimate the light in the plane parallel to the output surface 110'.

Preferably, the angle formed by the wedge shape matches or exceeds the first divergent emission angle. This is done so that the input surface 106' gathers all or most of the incident light.

Similar to the first embodiment, the input surface 106' may be curved to collimate the light in a plane perpendicular to the output surface 110'. Here again, the depth 306' of the optical element 106' is chosen so that the input surface 106' gathers all or most of the light along the second divergent emission angle 206.

It may be impractical in some applications to mount the light source 10 the predetermined distance 300 from the input surface. In these cases, fiber optics may be used to remotely locate the NIR light source 10. An optical difference caused by fiber optics is that the first divergent angle 202 and the second divergent angle 206 are usually the same thus producing a common divergent angle. This common divergent angle generally ranges from 10° to 40° full-width-at-half-maximum intensity. Consequently, the depth 306 of the optical element 104 should match the width 302.

In another embodiment, a lens, holographic plate, diffractive optics, or other suitable second optical element may be disposed between the fiber optics and the input surface 106 of the optical element 104 to modify the common divergent emission angle to reproduce the first divergent emission angle 202 and second divergent emission angle 206, or any other divergent emission angles.

In other examples, the angle of each of the individual facets 122 can be made slightly different to cause a divergence in the illumination pattern. The output surface 110 may be formed as a micro-lens array, and a holographic light-shaping diffuser can be attached to the output surface 110. Similar changes may be made to the input surface 106, facets 122, and output surface 110 to cause a divergence in the illumination pattern along the width 302 direction.

In both embodiments of FIGS. 2–5, however, the color-corrected source 23, 23' likewise fills the optical element 104, 104' to "mask" the emitted NIR light.

From the foregoing, it can be seen that there has been brought to the art a new and improved color-corrected laser headlamp for active night vision applications. While the invention has been described in connection with one or more embodiments, it should be understood that the invention is not limited to those embodiments. For example, the color-corrected light source can be used with numerous alternate optical elements to achieve any desired emission pattern for illuminating objects. In this regard, the invention covers all alternatives, modifications and equivalents as may be included within the spirit and scope of the appended claims.

The invention claimed is:

1. A lighting system for night vision applications comprising:
   a near infrared light source;
   an optical element disposed a distance from said near infrared source, the optical element having an input surface for receiving light from said near infrared source and an output surface for emitting said received light in a desired emission pattern; and
   at least one visible, non-red light source arranged proximate a surface of the optical element such that the output surface of said optical element emits said visible light to mask the emitted near infrared light.

2. A lighting system according to claim 1 wherein said near infrared light source comprises a laser diode emitting light at wavelengths between approximately 800–900 nm and said visible, non-red light source comprises a light source emitting light at wavelengths between approximately 400–600 nm.

3. A lighting system according to claim 1 wherein said visible, non-red light source comprises a plate having a plurality of non-red LEDs arranged thereon.

4. A lighting system according to claim 2 wherein said visible, non-red light source comprises a plurality of non-red LEDs.

5. A lighting system according to claim 3 wherein said optical element comprises a substantially planar thin-sheet optical element, and said plate is arranged substantially parallel to an exterior surface of said optical element.

6. A lighting system according to claim 5 wherein said plate is arranged proximate a surface of said optical element that is perpendicular to said input surface.

7. A lighting system according to claim 3 wherein each non-red LED includes a respective collimating lens.

8. A lighting system according to claim 1 comprising a camera adapted to receive near infrared light from said near infrared light source reflected off an object within a camera field of view.

9. A lighting system according to claim 8 comprising a display for imaging objects detected within said camera field of view.

10. A lighting system according to claim 1 wherein said optical element output surface is approximately perpendicular to said input surface, and said optical element comprises a stepped surface angled between the input surface and the output surface, the stepped surface having a plurality of reflecting facets arranged such that the light is reflected by the plurality of reflecting facets in passing from the input surface to the output surface.

11. A lighting system according to claim 1 wherein said optical element comprises a thin-sheet optical element comprising an aspherical entrance surface for collimating light passing through the entrance surface, a substantially planar exit surface generally perpendicular to an axis of symmetry of the entrance surface, and a stepped surface opposing the substantially planar exit surface having a plurality of steps generally parallel to the exit surface separated by associated angled facets disposed at an angle to reflect the light passing through the entrance surface and out the exit surface.

12. A lighting system for night vision applications comprising:
   a near infrared light source;
   a visible, non-red light source; and
   an optical element arranged proximate said near infrared light source and said visible, non-red light source, the optical element receiving light from said near infrared source and said visible, non-red light source and emitting said combined received light in a desired emission pattern such that said near infrared light is masked by said visible, non-red light.

13. A lighting system according to claim 12 wherein said near infrared light source comprises a laser diode emitting light at wavelengths between approximately 800–900 nm and said visible, non-red light source comprises a light source emitting light at wavelengths between approximately 400–600 nm.

14. A lighting system according to claim 12 wherein said visible, non-red light source comprises a plate having a plurality of non-red LEDs arranged thereon, said plate being arranged substantially parallel to an exterior surface of said optical element.

15. A lighting system according to claim 14 wherein said optical element comprises a substantially planar thin-sheet optical element.

16. A lighting system according to claim 15 wherein said plate is arranged proximate a surface of said optical element that is perpendicular to an input surface for receiving said near infrared light.

17. A lighting system according to claim 14 wherein each non-red LED includes a respective collimating lens.

18. A lighting system according to claim 12 comprising a camera adapted to receive near infrared light from said near infrared light source reflected off an object within a camera field of view.

19. A lighting system according to claim 18 comprising a display for imaging objects detected within said camera field of view.

20. A lighting system for night vision applications comprising:
   a near infrared light source;
   a thin-sheet optical element disposed a distance from said near infrared source, the optical element having an input surface for receiving light from said near infrared source and an output surface for emitting said received light in a desired emission pattern;
   a visible, non-red light source comprising a plate having a plurality of non-red LEDs arranged thereon, said plate being proximate a surface of the optical element such that the output surface of said optical element emits said visible light to mask the emitted near infrared light;
   a camera adapted to receive near infrared light from said near infrared light source reflected off an object within a camera field of view; and
   a display for imaging objects detected within said camera field of view.

* * * * *